United States Patent
Yoo et al.

(10) Patent No.: US 12,322,127 B2
(45) Date of Patent: Jun. 3, 2025

(54) DEPTH COMPLETION METHOD AND APPARATUS USING A SPATIAL-TEMPORAL

(71) Applicant: FOUNDATION OF SOONGSIL UNIVERSITY-INDUSTRY COOPERATION, Seoul (KR)

(72) Inventors: Myung Sik Yoo, Seoul (KR); Minh Tri Nguyen, Seoul (KR)

(73) Assignee: FOUNDATION OF SOONGSIL UNIVERSITY-INDUSTRY COOPERATION, Seoul (KR)

(*) Notice: Subject to any disclaimer, the term of this patent is extended or adjusted under 35 U.S.C. 154(b) by 378 days.

(21) Appl. No.: 18/098,904

(22) Filed: Jan. 19, 2023

(65) Prior Publication Data

US 2023/0230269 A1 Jul. 20, 2023

(30) Foreign Application Priority Data

Jan. 20, 2022 (KR) .................. 10-2022-0008217

(51) Int. Cl.
*G06T 7/579* (2017.01)
*G06N 3/0442* (2023.01)
(Continued)

(52) U.S. Cl.
CPC ........... *G06T 7/579* (2017.01); *G06N 3/0442* (2023.01); *G06N 3/0455* (2023.01); *G06T 7/248* (2017.01);
(Continued)

(58) Field of Classification Search
CPC ..... G06T 7/50–596; G06T 2207/10014; G06T 2207/10012; G06T 2207/10016;
(Continued)

(56) References Cited

U.S. PATENT DOCUMENTS

| | | | |
|---|---|---|---|
| 2020/0293064 A1* | 9/2020 | Wu | G06N 3/045 |
| 2022/0067950 A1* | 3/2022 | Lv | G06N 3/08 |
| 2022/0262023 A1* | 8/2022 | Vignard | G06V 10/82 |

FOREIGN PATENT DOCUMENTS

| | | |
|---|---|---|
| KR | 10-2021-0073416 A | 6/2021 |
| WO | WO 2021/013334 A1 | 1/2021 |

OTHER PUBLICATIONS

Fu, Chen, et al. "Depth completion via inductive fusion of planar lidar and monocular camera." 2020 IEEE/RSJ International Conference on Intelligent Robots and Systems (IROS). IEEE, 2020. (Year: 2020).*

(Continued)

*Primary Examiner* — Geoffrey E Summers
(74) *Attorney, Agent, or Firm* — Stein IP LLC

(57) ABSTRACT

Provided are a depth completion method and apparatus using spatial-temporal information. The depth completion apparatus according to the present invention comprises a processor; and a memory connected to the processor, wherein the memory stores program instructions executable by the processor for performing operations comprising receiving an RGB image and a sparse image through a camera and LiDAR, generating a dense first depth map by processing color information of the RGB image through a first branch based on an encoder-decoder, generating a dense second depth map by up-sampling the sparse image through a second branch based on an encoder-decoder, generating a third depth map by fusing the first depth map and the second depth map, and generating a final depth map including a trajectory of a moving object included in an RGB image continuously captured during movement by inputting the third depth map to a convolution long term short memory (LSTM).

7 Claims, 4 Drawing Sheets

(51) Int. Cl.
  *G06N 3/0455* (2023.01)
  *G06T 7/246* (2017.01)
  *G06T 7/521* (2017.01)
  *G06V 10/82* (2022.01)
  *G06V 20/58* (2022.01)

(52) U.S. Cl.
  CPC .............. *G06T 7/521* (2017.01); *G06V 10/82* (2022.01); *G06V 20/58* (2022.01); *G06T 2207/10024* (2013.01); *G06T 2207/10028* (2013.01); *G06T 2207/20084* (2013.01); *G06T 2207/20221* (2013.01); *G06T 2207/30241* (2013.01)

(58) Field of Classification Search
  CPC . G06T 2207/10021; G06T 2207/10024; G06T 2207/20081; G06T 2207/20084; G06T 2207/10028; G06T 2207/20221; G06T 2207/30241; G06T 2207/30261; G06T 7/248; G06V 10/82; G06V 20/56–58; G06N 3/0455; G06N 3/045; G06N 3/0442; G06N 3/044
  See application file for complete search history.

(56) References Cited

OTHER PUBLICATIONS

Ma, Fangchang, Guilherme Venturelli Cavalheiro, and Sertac Karaman. "Self-supervised sparse-to-dense: Self-supervised depth completion from lidar and monocular camera." 2019 international conference on robotics and automation (ICRA). IEEE, 2019. (Year : 2019).*

Prakash, Aditya, Kashyap Chitta, and Andreas Geiger. "Multi-Modal Fusion Transformer for End-to-End Autonomous Driving." 2021 IEEE/CVF Conference on Computer Vision and Pattern Recognition (CVPR). IEEE, 2021. (Year: 2021).*

Shivakumar, Shreyas S., et al. "Dfusenet: Deep fusion of rgb and sparse depth information for image guided dense depth completion." 2019 IEEE Intelligent Transportation Systems Conference (ITSC). IEEE, 2019. (Year: 2019).*

Nguyen, Tri, and Myungsik Yoo. "Dense-depth-net: a spatial-temporal approach on depth completion task." 2021 IEEE Region 10 Symposium (TENSYMP). IEEE, 2021. (Year: 2021).*

1st Office Action issued on Dec. 5, 2023 for Korean Patent Application No. 10-2022-0008217.

* cited by examiner

DEPTH COMPLETION METHOD AND APPARATUS USING A SPATIAL-TEMPORAL

CROSS-REFERENCE TO RELATED APPLICATIONS

This application claims the benefit of Korean Application No. 10-2022-0008217, filed Jan. 20, 2022, in the Korean Intellectual Property Office. All disclosures of the document named above are incorporated herein by reference.

TECHNICAL FIELD

The present invention relates to a depth completion method and apparatus using spatial-temporal information.

BACKGROUND ART

A high-precision depth image is important for a variety of functions in autonomous vehicles, such as 3D object detection, map reconstruction, or route planning.

In particular, depth completion is an essential function in autonomous vehicle sensing systems.

Scene geometry representation has been extensively studied in supervised learning or self-supervised learning using various convolution neural networks (CNNs).

LiDAR (Light Detection and Ranging) is a sensor that acquires distance information with an object based on the time it takes for a laser pulse to be reflected and returned to an object after emitting it.

However, during actual measurement, laser pulses may not return to LiDAR due to noise or a wide range of lighting conditions, which may cause errors in data collection from LiDAR.

PATENT LITERATURE

Korean Patent Application Publication No. 10-2021-0073416

Disclosure

Technical Problem

In order to solve the problems of the prior art, the present invention proposes a depth completion method and apparatus using spatial-temporal information that can improve performance by utilizing all spatial-temporal information.

Technical Solution

In order to achieve the above object, according to an embodiment of the present invention, a depth completion apparatus using spatial-temporal information comprises a processor; and a memory connected to the processor, wherein the memory stores program instructions executable by the processor for performing operations comprises receiving an RGB image and a sparse image through a camera let and LiDAR, generating a dense first depth map by processing color information of the RGB image through a first branch based on an encoder-decoder, generating a dense second depth map by up-sampling the sparse image through a second branch based on an encoder-decoder, generating a third depth map by fusing the first depth map and the second depth map, and generating a final depth map including a trajectory of a moving object included in an RGB image continuously captured during movement by inputting the third depth map to a convolution long term short memory (LSTM).

The first encoder of the first branch and the second encoder of the second branch may include a plurality of layers, and the first and second encoders may include a convolutional layer and a plurality of residual blocks having a skip connection.

Each layer of the first encoder may be connected to each layer of the second encoder to help preserve rich features of the RGB image.

The convolution LSTM may calculate a future state of an input pixel according to a past state of a corresponding local neighboring pixel in a previous frame of the RGB image.

The convolutional LSTM may calculate a hidden state and cell statistics in the previous frame, and may calculate a future state of a cell using a window sliding the RGB image to obtain a trajectory of a moving object.

According to other embodiment of the present invention, a depth completion method using spatial-temporal information in an apparatus including a processor and a memory comprises receiving an RGB image and a sparse image through a camera and LiDAR; generating a dense first depth map by processing color information of the RGB image through a first branch based on an encoder-decoder; generating a dense second depth map by up-sampling the sparse image through a second branch based on an encoder-decoder; generating a third depth map by fusing the first depth map and the second depth map: and generating a final depth map including a trajectory of a moving object included in an RGB image continuously captured during movement by inputting the third depth map to a convolution long term short memory (LSTM).

According to another embodiment of the present invention, a computer-readable recording medium storing a program for performing the above method is provided.

Advantageous Effects

According to the present invention, since depth completion is performed by utilizing all spatial-temporal information, there is an advantage in that accuracy can be increased.

DESCRIPTION OF DRAWINGS

These and/or other aspects will become apparent and more readily appreciated from the following description of the embodiments, taken in conjunction with the accompanying drawings in which.

DETAILED DESCRIPTION OF EMBODIMENTS

Figure 1:
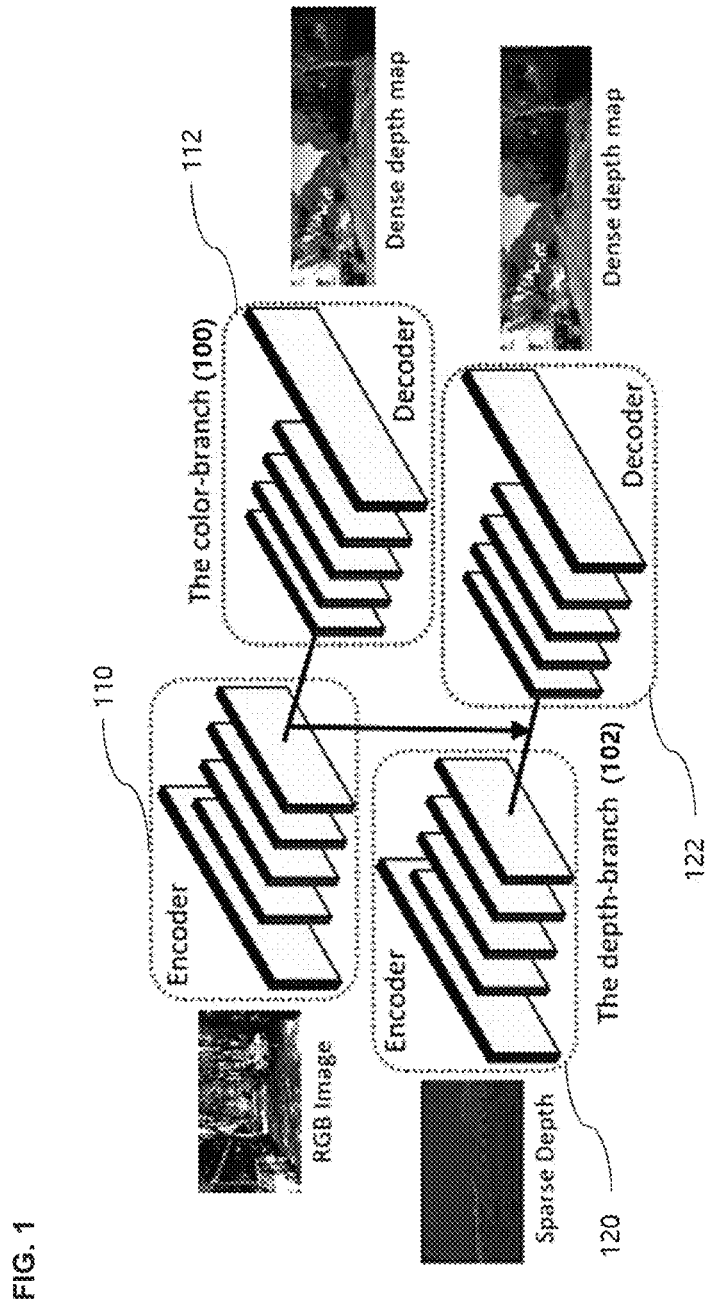
FIG. 1 is a diagram illustrating a depth completion architecture according to an embodiment of the present invention.

Since the present invention can make various changes and have various embodiments, specific embodiments are illustrated in the drawings and described in detail.

However, this is not intended to limit the present invention to specific embodiments, and should be understood to include all modifications, equivalents, and substitutes included in the spirit and technical scope of the present invention.

Figure 2:
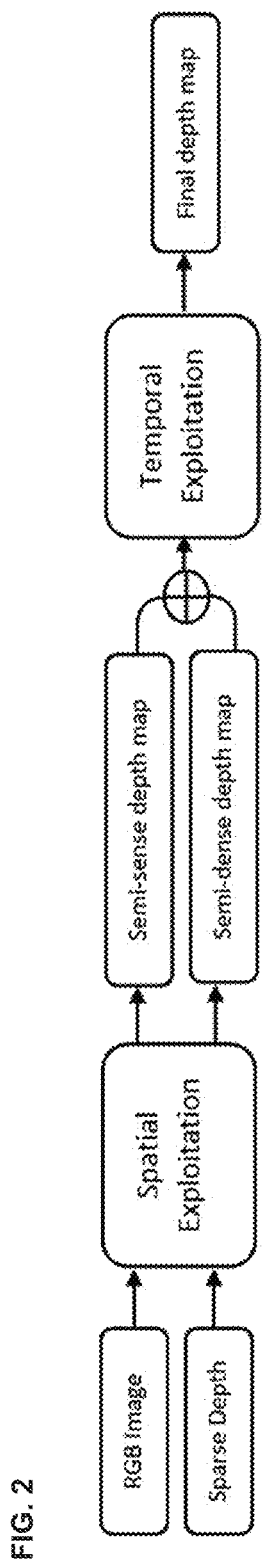
FIG. 2 is a diagram illustrating a workflow according to the present embodiment.

FIG. 1 is a diagram showing a depth completion architecture according to an embodiment of the present invention, and FIG. 2 is a diagram showing a workflow according to the present embodiment.

Depth completion according to the present embodiment is composed of two stages: a spatial exploitation stage and a temporal exploitation stage.

The stage according to the present embodiment includes two branches, and each branch comprises an encoder-decoder architecture.

The first branch (color-branch) 100 is defined as a color branch, and processes color information from an RGB image, which is an input captured through a camera, to generate a dense first depth map, and a second branch (depth-branch) 102 up-samples a sparse depth image obtained through a LiDAR to generate a dense second depth map.

The first encoder 110 of the first branch 100 includes a plurality of layers, the first layer is a 3×3 convolution, and then includes a plurality of residual blocks with skip connections.

The first decoder 112 of the first branch 100 may include five deconvolution layers and one convolution in the last layer.

Each layer is combined after a ReLU layer and a batch normalization layer.

The second branch 102 takes a sparse image as an input and up-samples it to generate a dense second depth map.

The sparse image is obtained by converting the spherical coordinate system related to the geometric information of the point obtained through a LiDAR into a cartesian coordinate system and projecting it onto the image plane.

The second branch 102 also includes an encoder-decoder (second encoder 120, second decoder 122) architecture, the second encoder 120 of the second branch 102 includes a plurality of layers, and the first layer is a 3×3 convolution and may include a plurality of residual blocks with skip connections.

When down-sampling the depth information in the second branch 202, each layer of the first encoder 110 is connected to each layer of a second encoder 120 to help preserve the rich features of the RGB image since the input is very sparse and unstructured.

A final depth map is generated by combining the two dense first and second depth maps output by the first branch 100 and the second branch 102.

Next, the temporal exploitation stage is described.

In the temporal exploitation stage, depth completion is performed as a time series of data in a single image dependency by considering a series of images separated by successive video frames of data.

Convolution Long Term Short Memory (LSTM) uses the predicted and fused third depth map in the spatial exploitation stage as an input.

Figure 3:
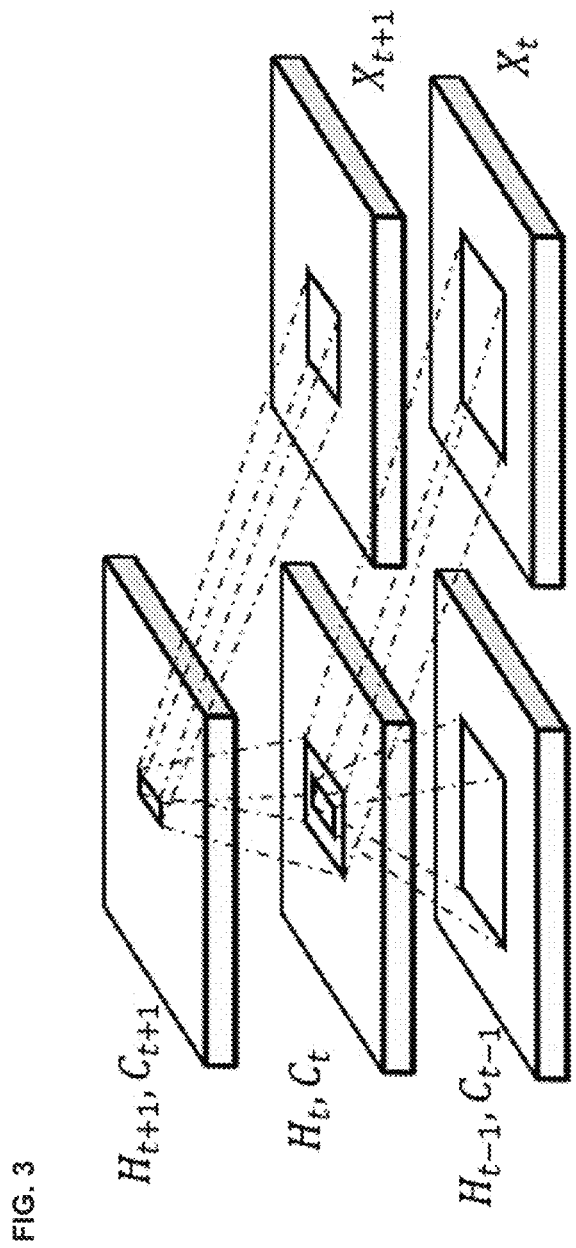
FIG. 3 is a diagram for describing a temporal exploitation stage according to the present embodiment.

As shown in FIG. 3, in the temporal exploitation stage, the future state of the input pixel is calculated according to the past state of the corresponding local neighboring pixel in the previous frame of the RGB image.

The convolutional LSTM calculates the hidden state $H_{t-1}$ and the cell statistics $C_{t-1}$ in the previous frame (t−1).

A convolutional LSTM includes a forget gate, an input gate, and an output gate.

The equations of the forget gate, input gate, output gate, cell state, and hidden state are expressed as Equation 1 below.

$$i_t = \sigma(W_{xi}*X_t + W_{hi}*H_{t-1} + W_{ci} \cdot C_{t-1} + b_i)$$

$$f_t = \sigma(W_{xf}*X_t + W_{hf}*H_{t-1} + W_{cf} \cdot C_{t-1} + b_f)$$

$$C_t = f_t \cdot C_{t-1} + i_t \cdot \tanh(W_{xc}*X_t + W_{hc}*H_{t-1} + b_c)$$

$$o_t = \sigma(W_{xo}*X_t + W_{ho}*H_{t-1} + W_{co} \cdot C_t + b_o)$$

$$H_t = o_t \cdot \tanh(C_t)$$

[Equation 1]

According to the present embodiment, if a future state of a cell is calculated using a small window sliding an input image, a final depth map can be generated by obtaining a fine movement trajectory of a moving object.

In the training process, the loss function is defined as:

$$L(\hat{D}) = \|(D - D_{gt}) \odot \|(D_{gt} > 0)\|^2$$

[Equation 2]

Here, $\hat{D}$ is the final depth map, and $D_{gt}$ is measured data.

However, since invalid pixels exist in the measured data, only valid depth values are selected.

According to the present embodiment, depth completion accuracy can be further improved by repeatedly updating weights of layers included in the first branch and the second branch through the loss function defined as described above.

Figure 4:
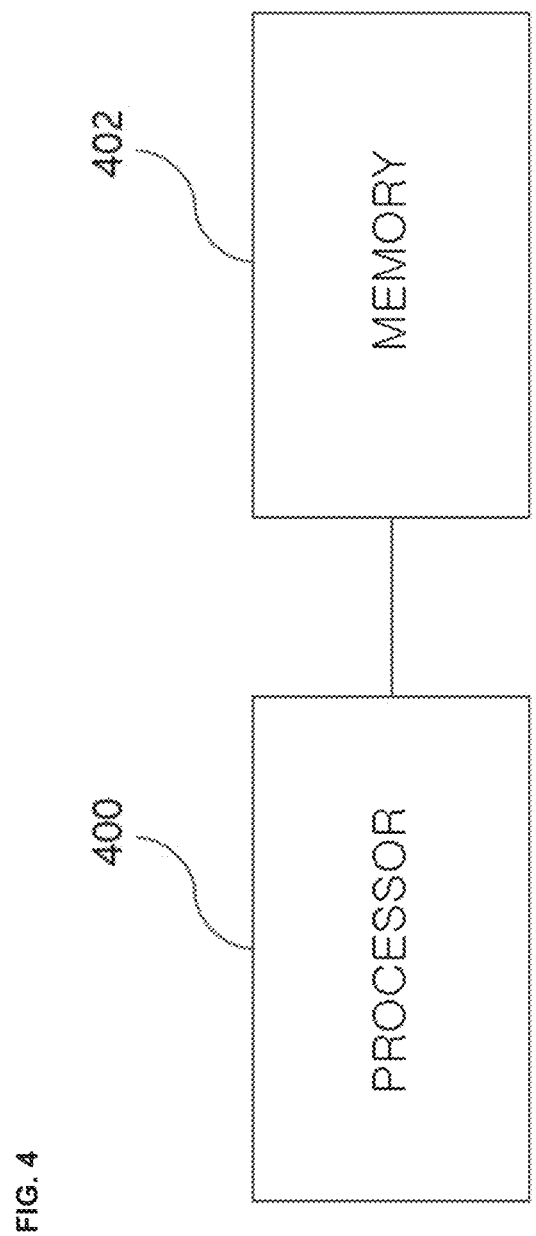
FIG. 4 is a diagram showing the configuration of the depth completion apparatus according to the present embodiment.

FIG. 4 is a diagram showing the configuration of the depth completion apparatus according to the present embodiment.

As shown in FIG. 4, the depth completion apparatus according to the present embodiment may include a processor 400 and a memory 402.

The processor 400 may include a central processing unit (CPU) capable of executing a computer program or other virtual machines.

Memory 402 may include a non-volatile storage device such as a non-removable hard drive or a removable storage device. The removable storage device may include a compact flash unit, a USB memory stick, and the like. Memory 402 may also include volatile memory, such as various random access memories.

The memory 402 according to the present embodiment stores program instructions for receiving an RGB image and a sparse image through a camera and LiDAR, generating a dense first depth map by processing color information of the RGB image through a first branch based on an encoder-decoder, generating a dense second depth map by up-sampling the sparse image through a second branch based on an encoder-decoder, generating a third depth map by fusing the first depth map and the second depth map, and generating a final depth map including a trajectory of a moving object included in an RGB image continuously captured during movement by inputting the third depth map to a convolution long term short memory (LSTM).

The embodiments of the present invention described above have been disclosed for illustrative purposes, and those skilled in the art having ordinary knowledge of the present invention will understand that various modifications, changes, and additions can be made within the spirit and scope of the present invention, and such modifications, changes, and additions will be considered to fall within the scope of the following claims.

The invention claimed is:

1. A depth completion apparatus using spatial-temporal information comprising:
   a processor; and
   a memory connected to the processor, wherein the memory stores program instructions executable by the processor for performing operations comprising:
receiving an RGB image and a sparse image through a camera and LiDAR,
generating a dense first depth map by processing color information of the RGB image through a first branch based on an encoder-decoder,
generating a dense second depth map by up-sampling the sparse image through a second branch based on an encoder-decoder,
generating a third depth map by fusing the first depth map and the second depth map, and
generating a final depth map including a trajectory of a moving object included in an RGB image continuously captured during movement by inputting the third depth map to a convolution long-term short memory (LSTM).

2. The depth completion apparatus of claim 1, wherein a first encoder of the first branch and a second encoder of the second branch include a plurality of layers,
wherein the first and second encoders include a convolutional layer and a plurality of residual blocks having a skip connection.

3. The depth completion apparatus of claim 2, wherein each layer of the first encoder is connected to each layer of the second encoder to help preserve rich features of the RGB image.

4. The depth completion apparatus of claim 1, wherein the convolution LSTM calculates a future state of an input pixel according to a past state of a corresponding local neighboring pixel in a previous frame of the RGB image.

5. The depth completion apparatus of claim 4, wherein the convolutional LSTM calculates a hidden state and cell statistics in the previous frame, and calculates a future state of a cell using a window sliding the RGB image to obtain a trajectory of a moving object.

6. A depth completion method using spatial-temporal information in an apparatus including a processor and a memory comprising:
receiving an RGB image and a sparse image through a camera and LiDAR;
generating a dense first depth map by processing color information of the RGB image through a first branch based on an encoder-decoder;
generating a dense second depth map by up-sampling the sparse image through a second branch based on an encoder-decoder;
generating a third depth map by fusing the first depth map and the second depth map; and
generating a final depth map including a trajectory of a moving object included in an RGB image continuously captured during movement by inputting the third depth map to a convolution long-term short memory (LSTM).

7. A non-transitory computer-readable medium storing a program for performing the method according to claim 6.

* * * * *